Patented Apr. 20, 1943

2,317,303

UNITED STATES PATENT OFFICE 2,317,303

HETEROCYCLIC NITROGEN CONTAINING COMPOUNDS, AND PROCESSES FOR MAKING THE SAME

William L. Ruigh, Princeton, N. J., assignor to Merck & Co., Inc., Rahway, N. J., a corporation of New Jersey No Drawing. Application December 7, 1940, Serial No. 369,138

10 Claims. (Cl. 260—297)

This invention relates to heterocyclic nitrogen containing compounds, and processes for making the same, and more particularly to those compounds which are related to the alkaloids of the pomegranate.

It is known that the alkaloids of the pomegranate are toxic towards certain animal parasites, especially the tapeworm. Extracts of the pomegranate plant are costly, difficult to store so as to retain full activity, and vary considerably in potency. Some extracts are very active while others have even been found to be totally inactive. Attempts to isolate the individual active alkaloids from these extracts have not been successful.

The true active taeniacidal principal of the pomegranate is 1-(α-piperidyl)-propanone-2. The heretofore known methods of synthesizing this compound are not easily carried out, result in poor yields, require the use of special expensive equipment, the reaction product is difficult to work up, and the reaction is sensitive to the conditions and amounts of the reactants employed.

I have discovered a method of synthesizing 1-(α-piperidyl)-propanone-2, which can be easily carried out, gives a good yield, and a pure product. I have also discovered that certain homologues of 1-(α-piperidyl)-propanone-2 exert marked toxic effects on the tapeworm, and are extremely useful medical agents. The compounds may be used in the form of salts, such as the hydrochloride, sulfate, tannate, bismuth complex, etc. The specific manner of taeniacidal action desired will govern the type of compound to be used. For example, salts such as the hydrochloride, sulfate, etc., yield a high concentration of the alkaloid immediately in the intestinal tract when ingested, whereas the bismuth complex or the tannate produces a slower and longer sustained action.

The new compounds of the present invention have the formula 1-(α-pyridyl)$CH_2XY$, 1-(α-piperidyl)$CH_2XY$, and salts thereof, wherein X is CO or CHOH, and Y is a lower alkyl group that is higher than methyl.

According to the present invention, in general the lithium derivative of picoline is reacted with an anhydride of an aliphatic acid. The resulting product is hydrogenated over a hydrogenation catalyst, such as platinum. Hydrogenation may occur in the ring alone, or both the ring and the ketone group may be hydrogenated, depending on the conditions employed. For purification the product may be distilled, crystallized through the picrate, or by other suitable means.

The following examples illustrate methods of carrying out the present invention, but it is to be understood that these examples are given by way of illustration, and not of limitation.

Example I

About 1 liter of dry ether is poured into a round bottom 22 liter flask, equipped with a large, high-speed paddle stirrer. A stream of dry nitrogen is run in, until all the air is displaced, and a slow current of nitrogen is maintained throughout the following reaction. 91.5 grams of lithium, cut into pieces the size of a small pea, are added, then about 50 cc. of dry bromobenzene, and the stirrer is started. After about 15 minutes, 6 liters of dry ether are added, and bromobenzene added until a total of 1036 grams has been used. Towards the end of the addition, further ether is added until a total of 12 liters have been used. When the lithium has reacted, 558 grams of α-picoline (dried over barium oxide) are gradually added. The solution is stirred for an additional 45 minutes, and then 918 grams of acetic anhydride are gradually added with cooling. The pasty mass is dumped into ice water, and any small pieces of lithium which may be present are removed from the surface of the ether layer. Hydrochloric acid is added until the solution is distinctly acid to Congo red, and the ether layer is discarded. The acid aqueous layer is extracted several times with benzene. To the aqueous layer is added a large excess of sodium hydroxide, and the alkaline solution extracted with four 1 liter portions of benzene. The benzene solution is dried over potassium carbonate, and the benzene distilled off under a slight vacuum. The residue is distilled at 10 mm. pressure, and the fraction boiling at 90 to 110° C. collected. On fractionation through an electrically heated, packed column, 178 grams of pure 1-(α-pyridyl)-propanone-2 are obtained, which boils at 100 to 101° C. at 10 mm. pressure. Yield 22%. With smaller amounts of acetic anhydride, yields of about 14% are obtained. The ketone has a deep yellow color, which is characteristic of the ketones of this series.

A mixture of 13.5 grams of 1-(α-pyridyl)-propanone-2, 300 cc. of alcohol, 9.4 cc. of concentrated hydrochloric acid and 0.5 gram of Adams platinum oxide catalyst is hydrogenated at 40 lb. pressure and 50° C. The reduction is complete in about four to six hours when 3 mols of hydrogen have been absorbed. The mixture is filtered, and the filtrate evaporated to dryness. The residue is taken up with a small amount of water, excess potassium hydroxide is added, and the free base extracted with ether. The excess ether is evaporated off, and the oil taken up in 40 cc. of absolute alcohol. The alcohol solution is added to a hot solution of 23 grams of picric acid in alcohol. On cooling, 27.4 grams (74%) of the picrate of 1-(α-piperidyl)-propanone-2, M. P. 147–8° C. are obtained. It is purified by recrystallization from alcohol, melting point 149.5° to 150° C.

25 grams of the picrate salt are suspended in 100 cc. of nitrobenzene, and 50 cc. of dilute hydrochloric acid are added. The mixture is warmed on a water bath, separated, and the hydrochloric acid solution extracted twice with 35 cc. portions of nitrobenzene, and twice with 35 cc. portions of ether. The hydrochloric acid solution is evaporated to dryness in vacuo, the residue recrystallized from a mixture of alcohol and acetone. Melting point 146.5 to 147.5° C.

*Example II*

6.8 grams of 1-(α-pyridyl)-propanone-2 are dissolved in 150 cc. of glacial acetic acid, 0.2 gram of Adams catalyst are added, and the mixture warmed to 40° C. It is hydrogenated for approximately 22 hours, and takes up about 95% of the theoretical amount of hydrogen. The mixture is filtered, evaporated in vacuum, made strongly alkaline with 30% potassium hydroxide, and extracted with 500 cc. of ether. The ether extract is dried with potassium hydroxide and evaporated. The residue is distilled at 16 mm. pressure. Yield 6.25 grams of material boiling at 107° to 120° C. The material crystallizes in the receiver, and on recrystallization from petroleum ether, 1-(α-piperidyl)-propanol-2 is obtained, M. P. 60–61° C. The latter compound can be oxidized to the corresponding ketone by means of an oxidizing agent, such as chromium trioxide.

However, it is not necessary to isolate the 1-(α-piperidyl)-propanol-2. For example, 54.4 grams of 1-(α-pyridyl)-propanone-2 are dissolved in 150 cc. of glacial acetic acid, and 1 gram of platinum catalyst is added. The mixture agitated with hydrogen for approximately 24 hours and then filtered. 200 cc. glacial acetic acid are added to the filtrate, and then a solution of 30 grams of chromium trioxide in 30 cc. of water is added slowly. The mixture is heated on the water bath for ½ hour, at the end of which time the acetic acid is evaporated off, the mixture is cooled, and 200 cc. of 50% potassium hydroxide are added. It is extracted with chloroform three times, using 150 cc. for each extraction. The chloroform extract is dried with anhydrous potassium carbonate, filtered and evaporated. The residue remaining is dissolved in 200 cc. of alcohol, and added to a solution of 92 grams of picric acid in 1,000 cc. of alcohol. The mixture is chilled and filtered. Yield, 83 grams of the picrate of 1-(α-piperidyl)-propanone-2, M. P. 144°–145° C.

The picric salt is suspended in 350 cc. of nitrobenzene and 150 cc. of dilute hydrochloric acid are added. The mixture is warmed on a water bath, separated, and the hydrochloric acid solution extracted twice with 100 cc. portions of nitrobenzene, and twice with 100 cc. portions of ether. The hydrochloric acid solution is evaporated to dryness in vacuo, and the residue recrystallized from a mixture of alcohol and acetone, melting point 146.5° to 147.5° C.

*Example III*

1-(α-pyridyl)-butanone-2 is prepared according to the process of Example I, employing:

| | | |
|---|---|---|
| Ether | liters | 2 |
| Lithium | grams | 53.4 |
| Bromobenzene | do | 604.5 |
| Picoline | do | 325.7 |
| Propionic anhydride | do | 455 |

The product is distilled at 10 mm. pressure, boiling point 110° to 112° C. Yield, 119.4 grams.

29.8 grams of 1-(α-pyridyl)-butanone-2 is dissolved in a mixture of 18.8 cc. of concentrated hydrochloric acid and about 300 cc. of absolute alcohol, and hydrogenated in the presence of 1 gram of platinum catalyst. The solution is filtered, and evaporated almost to dryness. It is taken up in a small amount of water, and made strongly alkaline with sodium hydroxide. The mixture is extracted with chloroform using 50, 20 and 20 cc. portions. The combined chloroform extracts are dried over potassium carbonate and filtered. The chloroform extract is then poured into a mixture of 50 grams of picric acid and 350 cc. of alcohol, and the mixture chilled in ice and filtered. The picrate is washed three times with alcohol and ether. The yield is 59.8 grams, M. P. 160° to 161° C. The hydrochloric salt is prepared from the picrate as in Example I, and has a M. P. 149° to 150° C.

*Example IV*

In a large flask equipped with a high speed stirrer, a reflux condenser, dropping funnel and suitable means for the introduction of nitrogen and lithium shavings, are placed 250 cc. of dry ether and 45.8 grams of lithium shavings. About 25 cc. of dry bromobenzene are added to the flask, and then 518 grams are added slowly. During the reaction, the air in the flask is replaced by nitrogen gas, and the mixture is cooled in an ice bath. When all the bromobenzene has been added, the mixture is stirred for about 20 minutes longer. After the lithium has reacted, 279 grams of picoline are added over a period of about 20 minutes. The solution is stirred for an additional 30 minutes, followed by the slow addition of 474 grams of butyric anhydride. Cooling is required during this addition. After all of the butyric anhydride has been added, the reaction mixture is stirred for about 15 minutes. It is poured into ice water, stirred, and any residual lithium removed from the surface of the ether layer. Hydrochloric acid is added until the solution is acid to Congo red and the ether layer discarded. The acid solution is extracted twice with ether, and then made strongly alkaline by the addition of a large excess of potassium hydroxide. The alkaline solution is extracted with four 500 cc. portions of benzene. The benzene extract is dried over potassium carbonate, filtered, and distilled in vacuo. The residue remaining after the removal of the benzene is distilled at 10 millimeters pressure. The yield of 1-(α-pyridyl)-pentanone-2 is 215 grams, and boils at 120–122° C. at 10 mm. pressure.

65.24 grams of 1-(α-pyridyl)-pentanone-2 are dissolved in a mixture of 37.6 cc. of concentrated hydrochloric acid and 600 cc. of absolute alcohol, and hydrogenated in the presence of 1.5 grams of platinum oxide catalyst. Three mols of hydrogen are taken up in about 6½ hours. The mixture is filtered and evaporated to dryness. The residue is taken up in 400 cc. of water, made alkaline to phenolphthalein, and 60 cc. of 6N sodium hydroxide are added. The solution is extracted four times with 200, 50, 50 and 50 cc. portions of chloroform. The chloroform extracts are combined, dried over potassium carbonate, filtered, poured into a solution of 100 grams of picric acid in 600 cc. of 95% alcohol, and the mixture is cooled. The picrate is filtered off and is further purified by recrystallization from alcohol (95%), M. P. 141.5° to 142.5° C. The hydrochloride salt is obtained from the picrate as in Example I. The hydrochloride of 1-(α-piperidyl)-pentanone-2 melts at 129.5° to 130.5° C.

*Example V*

130 grams of bismuth trichloride, 110 cc. of concentrated hydrochloric acid and 200 cc. of water are mixed together and stirred until the bismuth trichloride has dissolved. The solution is then diluted to 900 cc. This solution contains 10 grams of bismuth per 100 cc.

To 35.6 grams of the hydrochloride of 1-(α-piperidyl)-propanone-2 are added 620 cc. of the above bismuth solution, and 500 cc. of water. A white precipitate is formed, which is redissolved by adding 20 cc. of concentrated hydrochloric acid. To this mixture is added 100 cc. of 50% potassium iodide solution, the mixture is heated to boiling, and filtered to remove a small amount of gummy precipitate. 400 cc. of 50% potassium iodide solution are then added, and the mixture allowed to cool to room temperature. The mixture is then cooled in an ice box, and filtered. The precipitate is washed first with cold water, and then with a solution of 20 cc. of concentrated hydrochloric acid in about 600 cc. of water. The bismuth iodide of 1-(α-piperidyl)-propanone-2 is a red powder, yield 186 grams, or about 88%. It decomposes in the range of 170° to 200° C., and is practically insoluble in N/10 hydrochloric acid in the cold.

*Example VI*

To a cold (0° C.) solution of 8.9 grams of the hydrochloride of 1-(α-piperidyl)-propanone-2 in 200 cc. of water is added, with stirring and cooling, 482 cc. of cold 10% tannic acid solution. The temperature of the reaction mixture is kept at 0° C. After the addition of the tannic acid, 30.6 cc. of N sodium carbonate solution is added and the pH of the mother liquor adjusted, if necessary, to 6.6 (glass electrode). The suspension is stirred for one hour, and then allowed to stand in a refrigerator overnight. The precipitate is separated in a centrifuge, washed once with ice water and dried in vacuo. It is essential that the material be kept at a temperature of 0°–5° until dry.

Upon treating the hydrochloride of 1-(α-piperidyl)-pentanone-2 with sulphuric acid, the corresponding sulphate is formed.

Modifications may be made in carrying out the present invention, without departing from the spirit and scope thereof.

I claim:

1. The process comprising treating the lithium derivative of α-picoline with an anhydride of an aliphatic acid.

2. The process comprising treating the lithium derivative of α-picoline with an anhydride of an aliphatic acid, and hydrogenating the reaction product.

3. The process comprising reacting lithium with bromobenzene, treating the reaction product with α-picoline, and treating the latter reaction product with an anhydride of an aliphatic acid.

4. The process comprising reacting lithium with bromobenzene, treating the reaction product with α-picoline, and treating the latter reaction product with acetic anhydride.

5. The process comprising reacting lithium with bromobenzene, treating the reaction product with α-picoline, and treating the latter reaction product with propionic anhydride.

6. The process comprising reacting lithium with bromobenzene, treating the reaction product with α-picoline, and treating the latter reaction product with butyric anhydride.

7. The process comprising reacting lithium with bromobenzene, treating the reaction product with α-picoline, treating the latter reaction product with an anhydride of an aliphatic acid, and hydrogenating the latter reaction product.

8. The process comprising reacting lithium with bromobenzene, treating the reaction product with α-picoline, treating the latter reaction product with acetic anhydride, and hydrogenating the latter reaction product.

9. The process comprising reacting lithium with bromobenzene, treating the reaction product with α-picoline, treating the latter reaction product with propionic anhydride, and hydrogenating the latter reaction product.

10. The process comprising reacting lithium with bromobenzene, treating the reaction product with α-picoline, treating the latter reaction product with butyric anhydride, and hydrogenating the latter reaction product.

WM. L. RUIGH.